(12) United States Patent
Chang

(10) Patent No.: US 6,341,555 B1
(45) Date of Patent: Jan. 29, 2002

(54) PROTECTIVE DEVICE FOR POWER SUPPLY OF FRYING PAN

(75) Inventor: Li-Chen Chang, Pa-Te (TW)

(73) Assignee: Lyu Jan Co., Ltd., Pa-Te (TW)

( * ) Notice: Subject to any disclaimer, the term of this patent is extended or adjusted under 35 U.S.C. 154(b) by 0 days.

(21) Appl. No.: 09/920,766

(22) Filed: Aug. 3, 2001

(51) Int. Cl.[7] .............. A23L 1/00; A23L 1/01; A47J 27/08; A47J 37/12; H05B 1/02
(52) U.S. Cl. .............. 99/337; 99/330; 99/331; 99/403; 99/422; 219/433; 219/439; 219/441; 219/452.13
(58) Field of Search ................ 99/326–333, 337, 99/338, 403–408, 422, 426, 451, DIG. 14; 219/433, 431, 438, 439, 440, 441, 452.13, 400, 401, 386, 512, 443.1, 450.1, 508, 492, 464.1, 462.1

(56) References Cited

U.S. PATENT DOCUMENTS

| | | | | |
|---|---|---|---|---|
| 3,908,111 A | * | 9/1975 | Du Bois et al. | 219/442 |
| 4,315,139 A | * | 2/1982 | Onish et al. | 219/441 |
| 4,421,974 A | * | 12/1983 | Oota et al. | 219/441 |
| 4,587,405 A | * | 5/1986 | Andre | 219/491 |
| 4,591,698 A | * | 5/1986 | Chang | 219/400 |
| 5,031,519 A | * | 7/1991 | Toida et al. | 99/340 |
| 5,048,400 A | * | 9/1991 | Ueda et al. | 99/332 |
| 5,092,229 A | * | 3/1992 | Chen | 99/337 |
| 5,567,458 A | * | 10/1996 | Wu | 426/233 |
| 5,643,485 A | * | 7/1997 | Potter et al. | 219/621 |
| 5,727,448 A | * | 3/1998 | Sa | 99/331 |
| 5,839,357 A | * | 11/1998 | Ha et al. | 99/337 |
| 6,019,029 A | * | 2/2000 | Chan | 99/337 |

* cited by examiner

Primary Examiner—Timothy F. Simone
(74) Attorney, Agent, or Firm—Bacon & Thomas, PLLC

(57) ABSTRACT

A protective device for power supply of frying pan comprises a control lever disposed by side of a plurality of heat-source terminals; a power-supply unit laid on a base, having a power-supply chamber and a slot partitioned inside; a protective shield disposed on an inner top face of the power-supply unit, wherein a resilient device is disposed at a rear end of the protective shield to push the latter forward. When the frying pan is out of use, the protective shield is operated to cover an opening of the power-supply chamber, or when the frying pan is put to use, a user is supposed to place a pan casing on the base, then plug the control lever in the slot to push the protective shield backward to thereby open the opening of the power-supply chamber and allow the heat-source terminals to enter a power-supply jack and turn the power on.

5 Claims, 4 Drawing Sheets

PROTECTIVE DEVICE FOR POWER SUPPLY OF FRYING PAN

BACKGROUND OF THE INVENTION

A frying pan is an indispensable-cooking outfit in every family's kitchen, and it is particularly important to people, who love fried foods so much.

In general, an electrical frying pan is the most convenient frying pan for making fry foods, however, a power-supply jack disposed on the base of a conventional electrical frying pan is usually an open mouth which is defective in: (1) Incurring stains or a short circuit due to ooze of water into the jack when cleaning fat or dirt attached on surface of the base; or (2) Leaving unsightly fat residue or dirt behind on the base that would deteriorate hygienic conditions due to a sloppy cleaning job because of worry about ooze of water when cleaning.

In view of above said imperfection, after years of constant efforts in research, the inventor of this invention has consequently developed an improved mechanism to be described below pertaining to the subject matter.

SUMMARY OF THE INVENTION

The primary object of this invention is to provide a protective device for power supply of frying pan, wherein a protective shield is arranged to cover an opening of a power-supply chamber so as to prevent foreign articles or wet from entering the power-supply chamber and avoid any electric shock or short circuit accordingly to ensure security in using electricity.

Another object of this invention is to provide a protective device for power-supply of frying pan, wherein a protective shield is arranged to cover an opening of a power-supply chamber so as to facilitate the cleaning job of a base and prevent wet from invading into a power-supply jack and avoid rusting or poor conduction of the same in order to prolong its lifetime.

To realize abovesaid objects, a protective device for power supply of frying pan of this invention comprises: a control lever disposed by side of a plurality of heat-source terminals; a power-supply unit laid on a base, having a power-supply chamber and a slot partitioned inside; a protective shield disposed on an inner top face of the power-supply unit, wherein a resilient device is disposed at a rear end of the protective shield to push the latter forward. When the frying pan is out of use, the protective shield is operated to cover an opening of the power-supply chamber. When the frying pan is in use, a user is supposed to place a pan casing on the base, then plug the control lever in the slot to push the protective shield backward to thereby open the opening of the power-supply chamber and allow the heat-source terminals to enter a power-supply jack and turn the power on. After use, the user is supposed to lift up the pan casing of the frying pan to extract the control lever from the slot and the heat-source terminals from the power-supply jack. At this moment, as the control lever has departed from the protective shield, the latter is now pushed by the restoring force of the resilient device to move forward and close the opening of the power-supply chamber.

For more detailed information regarding advantages or features of this invention, at least an example of preferred embodiment will be elucidated below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE INVENTION

Figure 1:
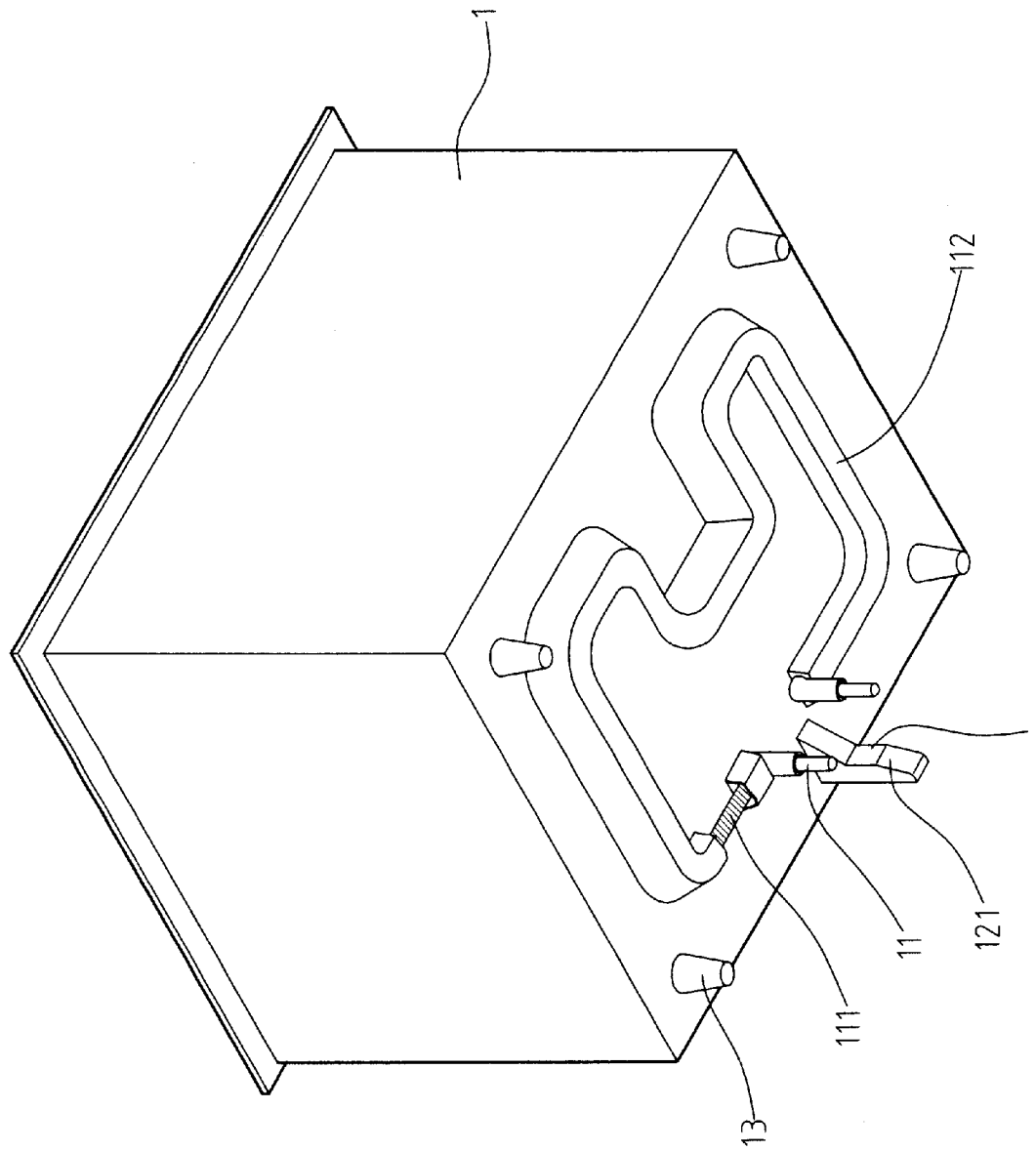
FIG. 1 is a perspective view of an embodiment of frying pan of this invention.
Figure 2:
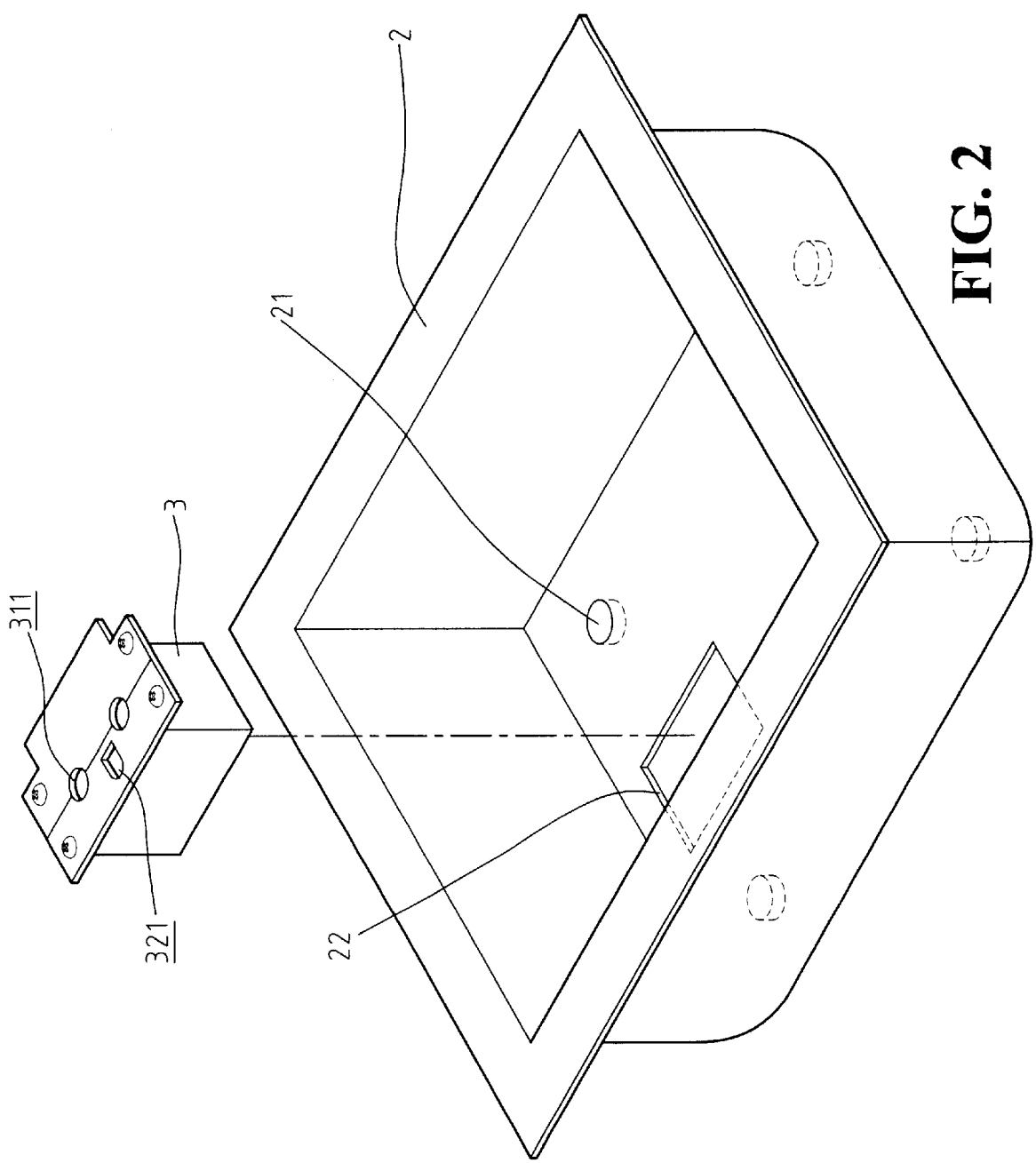
FIG. 2 is an exploded view of the embodiment in three dimensions of a base and a power-supply unit of this invention.

As illustrated in FIGS. 1 through 4, a protective device for power supply of frying pan of this invention comprises a pan casing (1), a base (2), and a power-supply unit (3).

A plurality of heat-source terminals (11) coupled with both ends of a heating element (111) is disposed on a bottom face of the pan casing (1), wherein the heating element (111) is invested by a protective duct (112); a control lever (12) is arranged laterally to the heat-source terminals (11) and obliquely provided at one end with a slope (121); and a plurality of positioning protrusions (13) is located on the bottom face of the pan casing (1) peripherally.

The base (2) is shaped to match with the bottom portion of the pan casing (1) and is provided with a plurality of positioning cavities (21) formed at positions corresponding to the positioning protrusions (13) of the pan casing (1), as well as an opening (22) for accommodating the power-supply unit (3).

The power-supply unit (3) is partitioned internally into a power-supply chamber (31) and a slot (32), wherein an opening (311), (321) is formed in the ceiling of the chamber and the slot respectively; a power-supply jack (312) is disposed in the power-supply chamber (31) and the bottom end of the power-supply jack (312) is jointed with a power cord (33). A protective shield (34) is assembled and placed in a sink (30), which is disposed in an inner portion at the top end of the power-supply unit (3), wherein an opening (341) is formed in the protective shield (34); and a resilient device (35), a compressive spring in this case, is arranged at a rear end of the protective shield (34).

By taking advantage of the resilient device (35), which always props against the rear end of the protective shield (34), the opening (341) of the protective shield (34) is located at the left (front) side of the opening (311) of the power-supply chamber (31) to cover the opening (311) and the power-supply jack (312) to ensure security in using electricity, while the front end of the protective shield (34) covers only a part of the opening (321), the rear portion, of the slot (32) when the frying pan is out of use.

Figure 4:
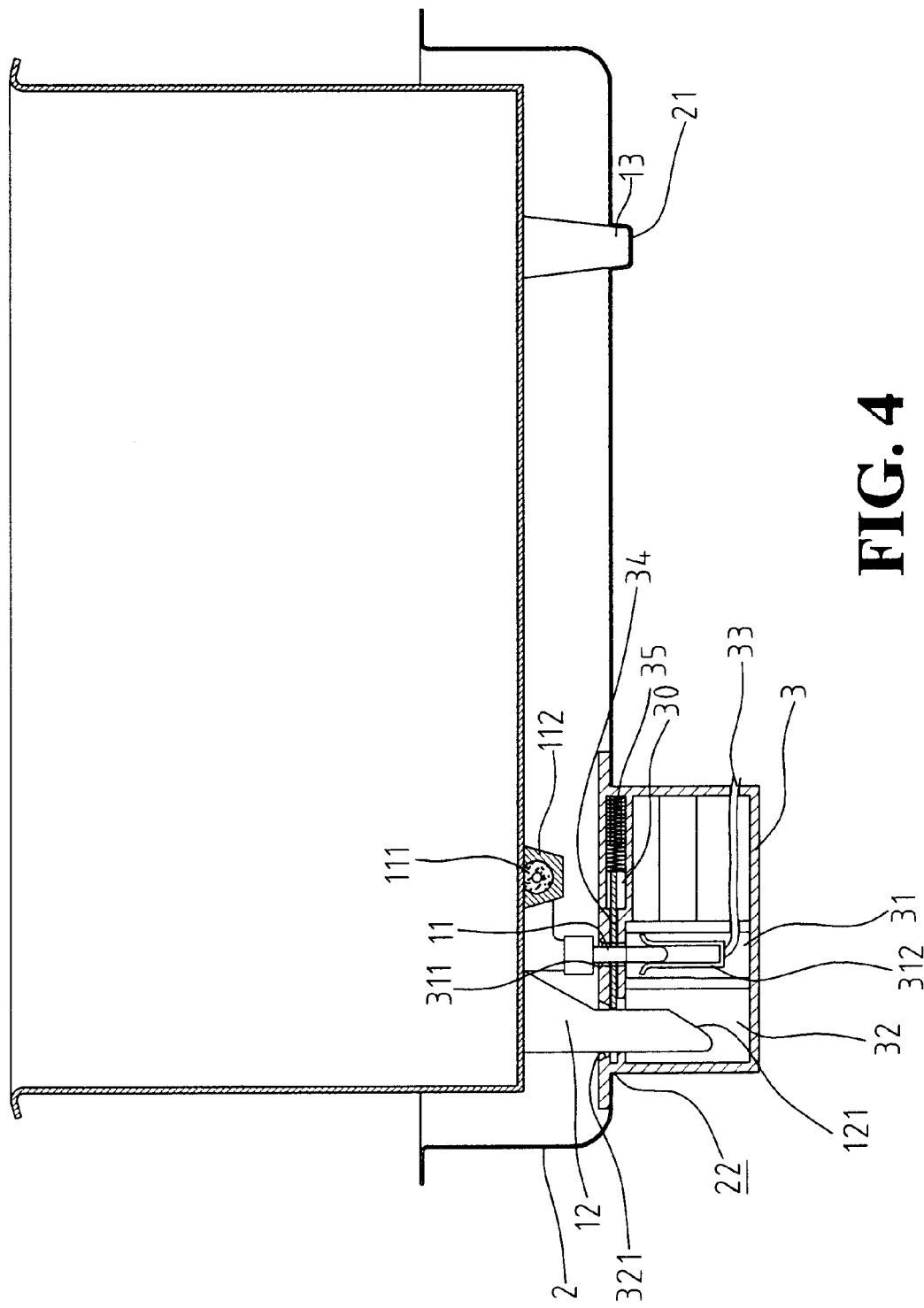
FIG. 4 is an assembled cutaway sectional view of the embodiment of this invention.

When the frying pan is in use, a user puts the pan casing (1) on the base (2), then plug the control lever (12) in the slot (32) through the opening (321) to have the slope (121) of the control lever (12) pushed the protective shield (34) to move backward (to the right side as shown in FIG. 4). Meanwhile, the opening (341) of the protective shield (34) is moved rightward until it reaches a position corresponding to the opening (311) of the power-supply chamber (31) to allow the heat-source terminals (11) to enter the power-supply jack (312) and turn the power on. At this moment, the positioning protrusions (13) of the pan casing (1) are sunk in the positioning cavities (21) of the base (2) exactly to have both the pan casing (1) and the base (2) united together certainly.

Figure 3:
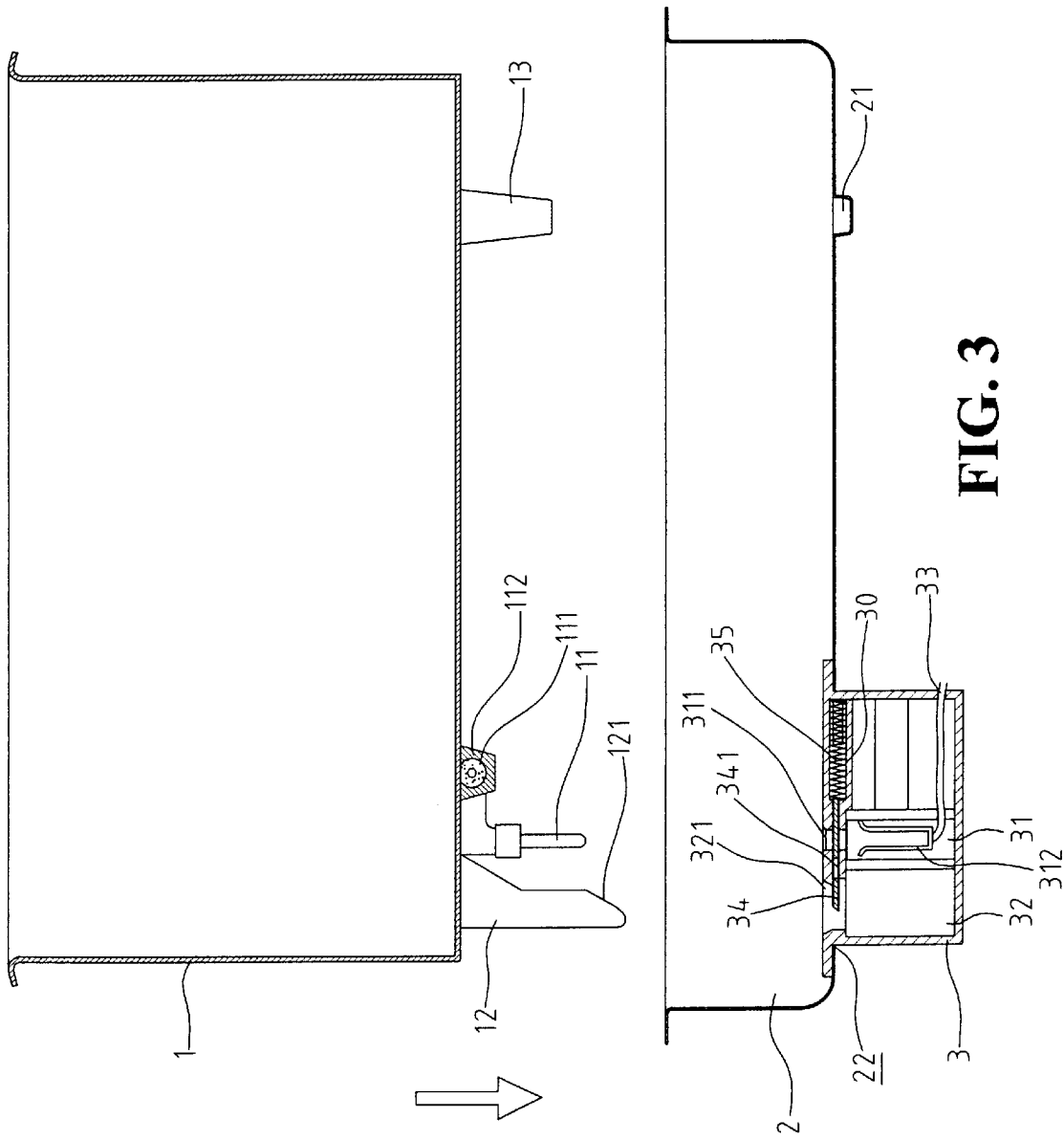
FIG. 3 is an exploded cutaway sectional view of the embodiment of this invention.

After use, the user is supposed to lift the pan casing (1) up to extract the positioning lever (12) from the slot (32) and the heat-source terminals (11) from the power-supply jack (11), and at this moment, the protective shield (34) is no longer pushed by the control lever (12), instead, it is pushed by the restoring force of the resilient device (35) to move forward (to the left side as shown in FIG. 3) to close the opening (311) of the power-supply chamber (31). In the above described, at least one preferred embodiment has been described in detail with reference to the drawings annexed, and it is apparent that numerous variations or modifications may be made without departing from the true spirit and scope thereof, as set forth in the claims below.

What is claimed is:

1. A protective device for power supply of frying pan, comprising:

a pan casing having a plurality of heat-source terminals disposed on its bottom face, wherein the heat-source terminals are connected with both ends of a heating element; and a control lever is located laterally to the heat-source terminals;

a base; and a power-supply unit installed in an opening of the base, being partitioned into a power-supply chamber and a slot, wherein an opening is formed in the ceiling of the power-supply chamber and the slot respectively; a sink is arranged on an inner top face of the power-supply unit; a protective shield is assembled and placed in the sink; an opening is formed in the protective shield; and a resilient device is assembled and located at a rear end of the protective shield.

2. The protective device according to claim 1, wherein the heating element is invested by a protective duct.

3. The protective device according to claim 1, wherein a slope is obliquely formed at one end of the control lever.

4. The protective device according to claim 1, wherein a plurality of positioning protrusions is placed on the bottom face of the pan casing peripherally to pair off with a plurality of positioning cavities formed in the base.

5. The protective device according to claim 1, wherein the resilient device is a compressive spring.

* * * * *